United States Patent
Brainerd et al.

[11] Patent Number: 5,878,834
[45] Date of Patent: Mar. 9, 1999

[54] FORMED SHEET METAL CARABINER GATE

[75] Inventors: Charles Brainerd; Hong Kyu Kwak; Frank Dolana, all of Salt Lake City, Utah

[73] Assignee: Black Diamond Equipment, Ltd, Salt Lake City, Utah

[21] Appl. No.: 592,597

[22] Filed: Jan. 16, 1996

[51] Int. Cl.[6] ............................................. A44B 21/00
[52] U.S. Cl. .................................... 182/3; 24/573.5
[58] Field of Search ................ 182/3, 5; 24/573.5, 24/598.2, 599.1, 599.6, 599.7, 599.8, 599.9, 600.3, 601.5

[56] References Cited

U.S. PATENT DOCUMENTS

| | | | |
|---|---|---|---|
| 1,263,745 | 4/1918 | Craven | 24/600.3 |
| 2,412,895 | 12/1946 | Lewis | 182/3 X |
| 2,492,991 | 1/1950 | Hanna | 24/599.6 |
| 3,358,340 | 12/1967 | Higuchi | 24/599.8 |
| 3,831,229 | 8/1974 | Craven | 24/599.8 X |
| 3,988,412 | 10/1976 | Woodson | 264/255 |
| 4,019,609 | 4/1977 | Wagner | 182/5 X |
| 4,350,732 | 9/1982 | Goodwin | 428/246 |
| 4,372,457 | 2/1983 | Kunimoto et al. | 215/228 |
| 4,432,404 | 2/1984 | Clark et al. | 145/2 R |
| 4,508,193 | 4/1985 | Forrest | 182/5 |
| 5,005,266 | 4/1991 | Fister et al. | 24/601.5 |
| 5,329,675 | 7/1994 | McClean et al. | |
| 5,357,657 | 10/1994 | Petzl | 24/573.5 X |
| 5,416,955 | 5/1995 | Katsma | 24/573.5 |
| 5,517,735 | 5/1996 | Tsai | 24/600.3 X |
| 5,517,949 | 5/1996 | Harris et al. | 24/598.2 X |

FOREIGN PATENT DOCUMENTS

| | | | |
|---|---|---|---|
| 1029557 | 6/1953 | France | 24/573.5 |
| 1203520 | 8/1970 | United Kingdom | 24/573.5 |

OTHER PUBLICATIONS

Wichard—Snap Hooks.
Black Diamond Equipment—Hotwire.

*Primary Examiner*—Alvin C. Chin-Shue
*Assistant Examiner*—Richard M. Smith
*Attorney, Agent, or Firm*—Thorpe, North & Western, LLP

[57] ABSTRACT

A gate for carabiners is disclosed including a first wing, a second wing and a bridge connecting the two. The first wing, the second wing and the bridge are stamped or otherwise cut out of a sheet of metal or other durable, bendable material. The wings are then bent relative to the bridge so that they oppose one another and form sides of the gate. One end of the gate is attached to the carabiner, while an opposing end of the gate is provided with a catch to selectively close an opening in the carabiner, and thereby selectively hold ropes or other items within the carabiner. In accordance with one aspect of the invention, a liner is disposed about the carabiner gate to limit wear caused to ropes, etc., by the carabiner gate. In accordance with another aspect of the invention, the area between the wings is filled with a filler to increase the strength of the gate.

27 Claims, 6 Drawing Sheets

FORMED SHEET METAL CARABINER GATE

BACKGROUND OF THE INVENTION

The present invention relates to an improved gate for a carabiner, and in particular, to a carabiner gate formed from sheet metal, such as may be used in rock climbing and rappelling.

Figure 1A:
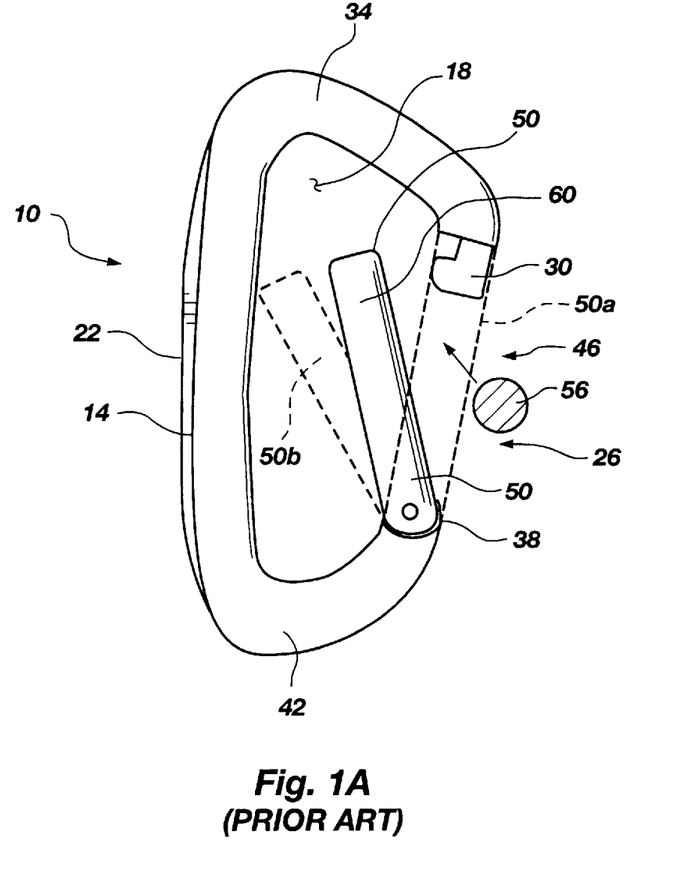
FIG. 1A shows a side view of a carabiner made in accordance with the teachings of the prior art.

The use of carabiners by rock climbers and rappellers has become widespread. As is shown in FIG. 1A, a carabiner, generally indicated at 10, is typically formed of a metallic body 14 which is formed into a generally prolate loop so as to circumscribe an opening or void 18. The carabiner 10 has a back portion 22, and a front portion, generally indicated at 26, which is either generally straight, as shown in FIG. 1A, or is concave.

The front portion 26 of the carabiner 10 is formed by an upper, free end 30 which extends downwardly from a top portion 34 of the carabiner body 14 in a hook-like manner, and a lower free end 38 which extends upwardly from a bottom portion 42 of the body. The space between the upper free end 30 and the lower free end 38 provides an opening, generally indicated at 46, through which climbing/rappelling ropes may be passed into the void 18 circumscribed by the body.

The opening 46 is selectively closed by a gate 50 which is pivotably attached to the lower free end 38. Typically, the gate is biased in a closed position, represented by the dashed lines 50*a*. In such a position, the gate prevents a rope which is held within the carabiner 10 from being pulled out through the opening 46. The gate also usually provides structural support to the body in tension. When it is desired to position another rope 56 within the carabiner 10, the rope is placed against the gate 50 and sufficient force is applied to overcome the biasing. This moves the gate into the position shown at 50, or even into the position shown at 50*b*. Those familiar with carabiners will appreciate that the rear portion 22 often provides a limitation to the distance which the gate 50 can be displaced.

Once the rope 56 is positioned within the void 18 circumscribed by the carabiner 10, the pressure on the gate 50 is released and it returns to the position shown at 50*a*. The rope 56 is thus properly held within the carabiner 10.

As shown in FIG. 1A, the gate 50 is generally cylindrical. Such a gate 50 has the advantage that it is easy to use, and the rounded outer surface 60 provides little friction against the rope 56. Those familiar with rock climbing and rappelling will be familiar with the high cost of ropes and the importance of minimizing wear. Unlike most other applications, a climber or rappeller must not use worn ropes, as one broken rope can result in severe injury or even death.

One problem with the gate 50 shown in FIG. 1A is that they are generally expensive to produce. Typically the gates are machined out of bar stock or extrusion metal. Machining the metal is generally more expensive and time consuming that other approaches such as stamping. Once the gate 50 has been machined, a spring (not shown) or some other biasing device must be loaded prior to attachment to the body 14 of the carabiner 10.

Figure 1B:
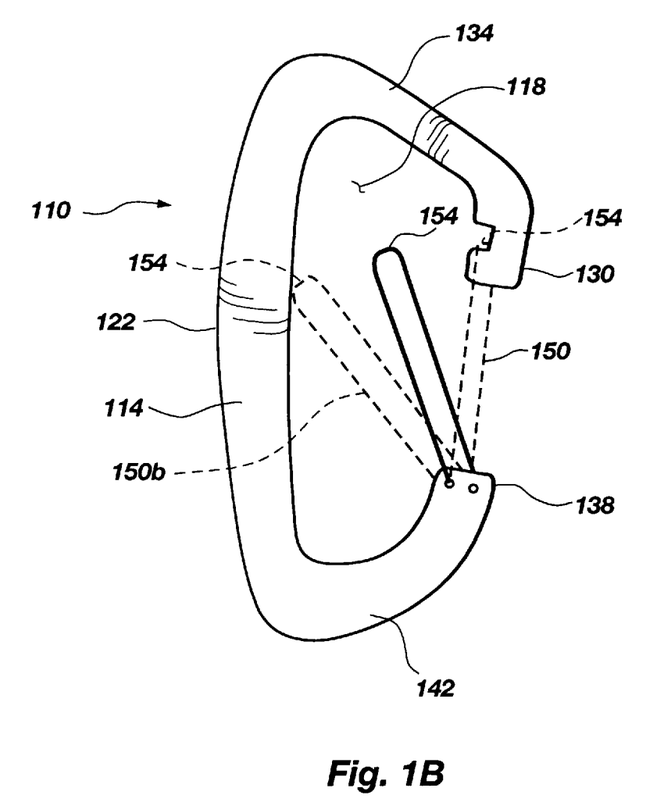
FIG. 1B shows a side view of an alternate embodiment of the carabiners of the prior art.

To overcome the problems and expense of machined gates, an alternative arrangement was developed in which the machined gate 50 is replaced by a piece of curved wire-like piece of metal. Referring now to FIG. 1B, there is shown a carabiner 110 with a body 114 circumscribing a void 118. The body 114 has a back side 122 and a generally straight front side 126. The body 114 also has a top portion 134 and a bottom portion 142 which support an upper free end 130 and a lower free end 138, respectively to form an opening 146.

Instead of having a machined gate, such as that shown in FIG. 1A, the opening 146 is selectively closed by a wire which is attached at each end to the lower free end 138. The wire forming the gate 150 is attached to the lower free end 138 in such a manner as to have a biased position, shown at 150*a*, in which a top 154 of the gate 150 rests in a notch 160 formed in the upper free end 130. In such a position, a rope (not shown) cannot be pulled through the opening 146.

The wire gate 150 has several advantages over the machined gate discussed above. First, it is easier to make and is less expensive. Second, it does not require a spring or other resilient member to be added. Rather, the biasing force is created by tension within the piece of metal. Third, the piece of metal provides the carabiner with less weight.

The wire gate 150 does have disadvantages. First, the wire causes increased wear on climbing and rappelling ropes. Instead of passing over one cylindrical body, the rope passes over two wires having a smaller curvature, causing greater wear. Additional concern is that some less experienced climbers may view the carabiners as being less safe due to the thinness of the wire compared to the conventional gate.

Thus, there is a need to provide a carabiner gate which overcomes the respective disadvantages of each type of currently available carabiner. Such a gate must be economical, durable and easy to use.

SUMMARY OF THE INVENTION

Thus, it is an object of the present invention to provide a carabiner gate which is easy to use and economical to make.

It is another object of the invention to provide a carabiner gate which may be made without machining or casting.

It is another object of the invention to provide a carabiner gate which minimizes wear on climbing and rappelling ropes.

It is another object of the invention to provide such a carabiner gate which facilitates access to the biasing mechanism within the gate.

It is yet another object of the invention to provide a carabiner gate which has a size similar to that of machined gates, but less weight.

It is still another object of the invention to provide a method for making gates which facilitates the making of gates having different shapes and sizes.

The above and other objects of the invention are realized in specific illustrated embodiments of a carabiner gate in which the gate is stamped or otherwise formed from sheet metal. After the sheet metal is stamped or otherwise cut, the piece of metal is bent to form a gate having a traditional size. For ease of reference, the term "stamped" as used herein is meant to include stamping, laser cutting and other methods of cutting the carabiner gate from a sheet of metal.

In accordance with one aspect of the invention, the stamped gate is formed with first and second wings connected to one another by a bridge. After the gates have been stamped, each wing is bent adjacent the bridge so that the wings provide sides to the gate. The wings are connected to one another at a first end through the lower free end of the carabiner body by a pin so as to attach the gate to the carabiner. At an opposing second end of the gate, the first and second wings are attached to one another by another pin.

In accordance with another aspect of the invention, the pin rests within the notch provided in the upper free end of the carabiner body to limit movement of the gate. Alternatively, an end piece is formed at one end of the first and second wings and extends is folded to provide a catch which causes the gate to engage the upper free end of the body.

In accordance with another aspect of the invention, the bridge connecting the first and second wings is disposed at the second end of each wing so that when the wings or bridge is bent, the bridge forms the catch for engagement with the carabiner.

In accordance with another aspect of the invention, the wings and the bridge are covered with a layer of material to prevent the edges of the wings from wearing on climbing and rappelling ropes which are used with the carabiner. The material may simply be a thin layer of a durable fabric wrapped about the exterior of the gate. In the alternative, the bent gate can be dipped into a material which is then solidified to not only provide an exterior layer to the gate, but also to fill the area between the wings to provide additional support. The material can also be molded around the gate.

In accordance with another aspect of the invention, the stamped wings are generally arcuate so as to provide a gate which is attachable to the body of the carabiner so as to provide a concave front portion.

The stamped gates allow gates of different profiles to be stamped or otherwise formed from a sheet of metal such as steel. Rather than machining the gates from pieces of metal, a simple die change allows numerous different designs of gates to be formed.

BRIEF DESCRIPTION OF THE DRAWINGS

The above and other objects, features and advantages of the invention will become apparent from a consideration of the following detailed description presented in connection with the accompanying drawings in which.

DETAILED DESCRIPTION

Reference will now be made to the drawings in which the various elements of the present invention will be given numeral designations and in which the invention will be discussed so as to enable one skilled in the art to make and use the invention. It is to be understood that the following description is only exemplary of the principles of the present invention, and should not be viewed as narrowing the pending claims.

Figure 2:
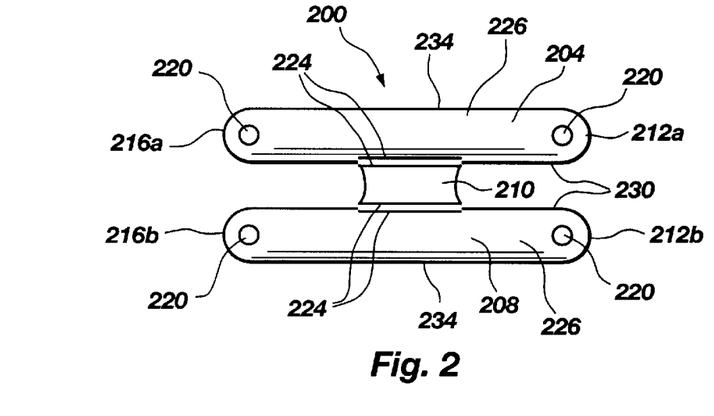
FIG. 2 shows a plan view of a carabiner gate made in accordance with the teachings of the present invention.

Referring to FIG. 2, there is shown a plan view of a carabiner gate, generally indicated at 200. The gate 200 is formed with a first wing 204 and a second wing 208. The two wings 204 and 208 are connected by a bridge 210. While shown in FIG. 2 as being small in length, the bridge could extend the entire length of the wings.

Each wing has a first end, 212a and 212b respectively, and a second end, 216a and 216b respectively. A hole 220 is formed in the wings 204 and 208 adjacent each respective end. The holes 220 provide receptacles for pins (not shown) which are used to hold the gate 200 to a carabiner (FIG. 2A) and to allow the gate to catch on the carabiner body.

The gate 200 will typically be made of a durable metal, such as stainless steel, 4130 alloy steels, titanium, or aluminum and will be about 0.05 to 0.125 inches thick. At such a thickness, gates 200 can be rapidly stamped or cut out of sheets of metal without the complication and expense involved with machining the gates. The open design also allows for greater access to any biasing member such as a spring.

After each gate has been stamped out, the wings 204 and 208 and/or the bridge 210 are bent along bending lines 224 so that the wings extend in a parallel direction: the top edges 230 of the wings being disposed at a similar distance from one another as the bottom edges 234 of the wings, and so that inner face 226 of each wing faces the inner face of the opposing wing.

Figure 2A:
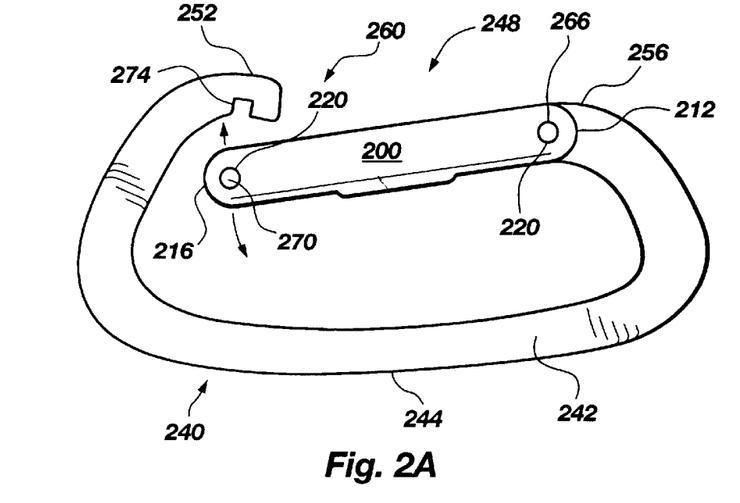
FIG. 2A shows a side view of a carabiner body, and the carabiner gate shown in FIG. 2, folded and attached to the carabiner body.

Referring now to FIG. 2A, there is shown a side view of the carabiner gate 200 of FIG. 2 attached to a carabiner body 240. As with the prior art embodiments, the carabiner 240 includes a body 242 with a back portion 244 and a front portion 248. The front portion 248 is formed by the upper free end 252 and the lower free end 256, and the opening 260 disposed between the two which is selectively closed by the carabiner gate 200.

The gate 200 is attached to the lower free end 256 of the carabiner body 242 by placement of a pin 266 through the hole 220 in the first end 212 of the gate in a conventional manner. The attachment of the carabiner gate 200 to the lower free end 256 allows the opposing second or free end 216 of the gate to pivot in the conventional manner.

The second or free end 216 of the carabiner gate 200 has a pin 270 extending through the hole 220. When the carabiner gate 200 is in a closed position, the pin 270 nests within the notch 274 which is positioned in the upper free end 252 of the carabiner body 242. If the pin 270 or some other stop mechanism were not provided, the gate 200 would be able to pivot out beyond the upper free end 252 of the carabiner body 242 and would provide little, if any, protection against the rope accidentally slipping from the carabiner, and no structural support to the body when in tension.

While not shown in FIG. 2A, the carabiner gate 200 will typically have a spring or other biasing member disposed therein. The biasing member can be attached to the gate 200 and to the lower free end 256 in a number of ways which will be apparent to those skilled in the art.

Figure 3:
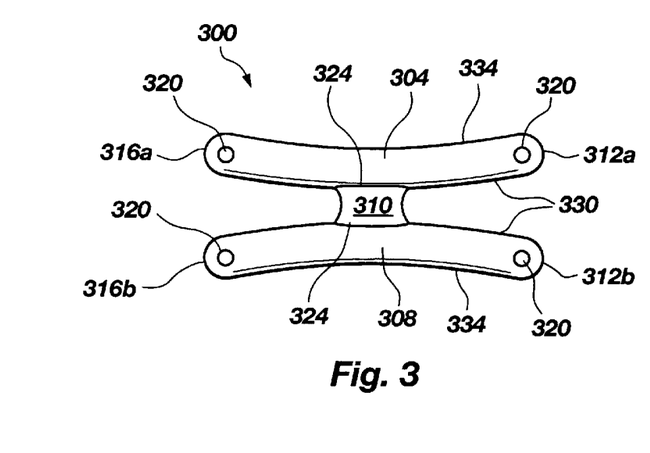
FIG. 3 shows a side view of an alternate embodiment of a carabiner gate made in accordance with the teachings of the present invention.

Referring now to FIG. 3, there is shown an alternate embodiment of the stamped carabiner gate, generally indicated at 300, made in accordance with the teachings of the present invention. The gate 300 includes a first arcuate wing 304 and a second arcuate wing 308. The two arcuate wings 304 and 308 are connected by a bridge 310. Typically, the wings 304 and 308 will arc away from the bridge, i.e., the side of each wing along which the bridge is attached will be generally convex. However, the wings 304 can be made to curve inwardly.

Each wing has a first end, 312a and 312b respectively, and a second end, 316a and 316b respectively. Holes 320 are formed in the wings so that one hole is adjacent each respective end. As with the previous embodiment, the holes 320 provide receptacle for pins (not shown) which are used to hold the gate 300 to a carabiner (FIG. 3A) and to allow the gate to catch on the carabiner body.

As with the prior embodiment, the carabiner gate 300 includes one or more bending lines 324 adjacent the attachment of the bridge to each respective wing 304 and 308. The wings 304 and 308 are bent relative to the bridge 310 so that the lower/inner edges 330 of each wing and the upper/outer edges of each wing 334 are disposed generally parallel with the corresponding edge of the other wing, and so that the lower/inner edges and the upper/outer edges are disposed apart from each other approximately the same distance.

Figure 3A:
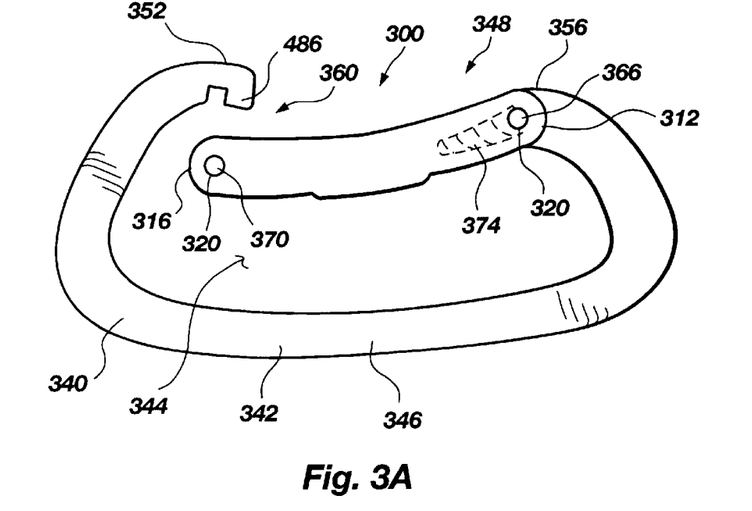
FIG. 3A shows a fragmented view of a carabiner body with the gate of FIG. 3 attached thereto.

Referring now to FIG. 3A there is shown a side view of the carabiner gate 300 discussed relative to FIG. 3 attached to a carabiner 340. As with the prior art embodiments, the carabiner 340 includes a body 342 formed in a prolate loop so as to circumscribe a void 344. The carabiner body 342 includes a back portion 346 and a front portion 348. The front portion 348 is formed by the upper free end 352 and the lower free end 356, and an opening 360 disposed between the two which is selectively closed by the carabiner gate 300. Due to the arcuate nature of the carabiner gate 300, the front portion 348 of the carabiner 340 is effectively concave. Those familiar with rock climbing and rappelling will appreciate that such a design is often more convenient to use than the straight carabiner gate 200 shown in FIGS. 2 and 2A, as the concave nature of the carabiner gate 300 facilitates the sliding of ropes into the void 344.

Those familiar with making carabiners, however, will appreciate that concave gates are usually more complex and more expensive to make. In contrast, with the present invention, the arcuate carabiner gate 300 is simple and economical to form and can be done by the simple replacement of a die in the stamping machine.

The gate 300 is attached to the lower free end 356 of the carabiner body 342 by placement of a pin 366 through the hole 320 in the first end 312 of the gate in a conventional manner. The attachment of the carabiner gate 300 to the lower free end 356 allows the opposing second or free end 316 of the gate to pivot in the conventional manner.

The second or free end 316 of the carabiner gate 300 has a pin 370 extending through the hole 320. When the carabiner gate 300 is in a closed position, the pin 370 nests within the notch 374 which is positioned in the upper free end 352 of the carabiner body 342. If the pin 370 or some other stop mechanism were not provided, the gate 300 would be able to pivot out beyond the upper free end 352 of the carabiner body 342 and would provide little, if any, protection against the rope accidentally slipping from the carabiner, nor provide strength when the body is placed under tension.

Also shown in FIG. 3A, is a shadowed representation of the biasing mechanism 374, typically a spring, which is disposed in the gate to force the second or free end 316 into contact with the upper free end 352 of the carabiner body 342 and thereby prevent ropes from accidentally being pulled through the opening 360.

Figure 4:
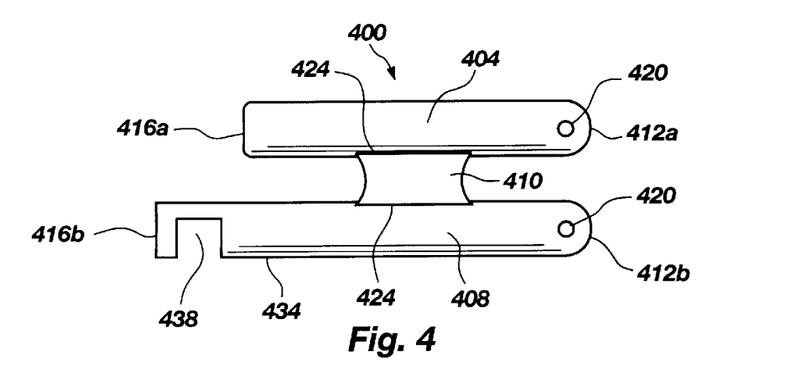
FIG. 4 shows a plan view of yet another embodiment of the present invention.

Referring now to FIG. 4, there is shown yet another embodiment of a stamped carabiner gate, generally indicated at 400, made in accordance with the present invention. The stamped carabiner gate 400 includes a first wing 404 and a second wing 408 with at least one bridge 410 extending between the two.

The wings each include a first end, 412a and 412b, respectively, and a second end, 416a and 416b, respectively, disposed opposite the first ends. As with the prior embodiments, the first ends 412a and 412b have holes 420 disposed therein for receiving a pin. The second ends 416a and 416b, however, do not have holes. Rather, the second end 416a of the first wing 404 has a blunt ending. The second wing 408, in contrast, extends beyond the end 416a of the first wing 404 a distance slightly greater than the width of the bridge 410 separating the first and second wings.

A notch 438 is formed in the outer edge 434 of the second wing 408. The depth of the notch 438 is typically between one-half and three-quarters of the width of the second wing 408. As will be explained in additional detail below, the notch effectively replaces the pins 270 and 370 disposed in the respective second ends 216 and 316 of the prior embodiments.

After the gate 400 is stamped from a sheet of metal, the wings 404 and 408 are bent with respect to the bridge 410 along the bending lines 424. The second end 416b of the second wing 408 is then bent toward and slightly around the second end 416a of the first wing 404. In such a manner, the second end 416b of the second wing 408 serves as a catch mechanism, and no pin is needed to prevent the gate 400 from extending beyond the upper free end (shown in FIGS. 2A and 3A at 252 and 352, respectively).

Figure 4A:
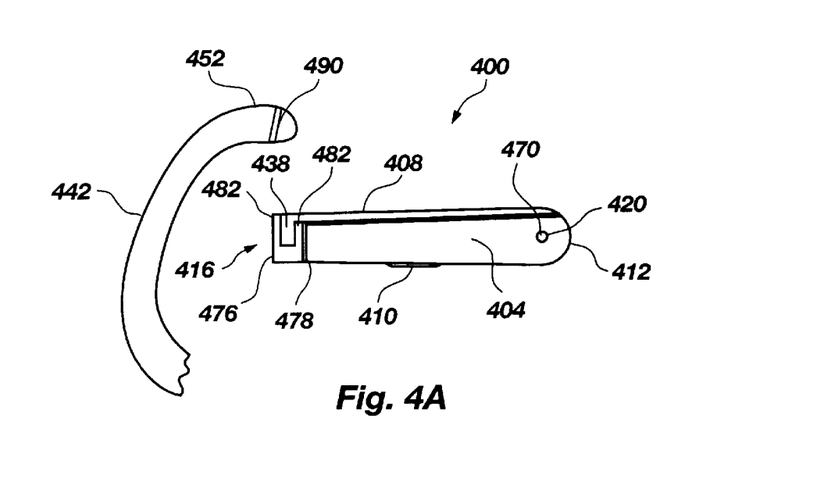
FIG. 4A shows a perspective view of the embodiment shown in FIG. 4 after the gate has been bent into the desired shape to form a carabiner gate.

When folded, the wings 404 and 408, etc, form a gate 400 as shown in FIG. 4A. The gate 400 has the first and second wings, 404 and 408, respectively, which are connected by a bridge 410. At the first end 412, the two wings 404 and 408 are connected by a pin 470 in the usual manner. At the opposing second end 416, however, the two wings 404 and 408 are connected by a catch 476 formed from the second end 416b of the second wing. Preferably, the second end 416b of the second wing 408 forms a small overwrap 478 which can be pressed or welded to the first wing 404 to provide added stability.

While the catch 476 can be used with a conventional upper free end such as those shown in FIG. 2A at 252 and in FIG. 3A at 352, the tabs 482 of the catch provide additional advantages. Those familiar with carabiners will appreciate that the hook-like upper free end (252 in FIG. 2A or 352 in FIG. 3A) has a significant disadvantage. Referring momentarily to FIG. 3A, the hook 486 has a tendency to get caught in clothing and other climbing equipment. However, the hook 486 is needed to allow the pin 370 to nest when the gate 300 is in a closed position.

Referring again to FIG. 4, the tabs 482 engage a rib 490 formed on the upper free end 452 of the carabiner body 442. The tabs 482 are disposed so as to have a slight frictional engagement with the rib 490 when under tension, and an "interference" engagement when no tension is present. The tabs 482 provide an equally secure engagement, but without the need for a hook 486 (FIG. 3A).

Figure 4B:
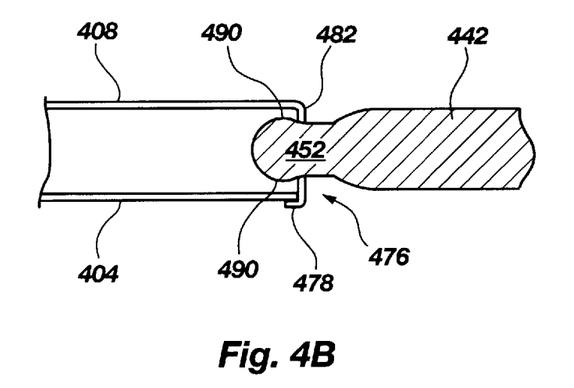
FIG. 4B shows a fragmented cross-sectional view of the second/free end of the carabiner gate of FIGS. 4 and 4A in a nesting arrangement with an upper free end of a carabiner body.

Referring now to FIG. 4B, there is shown a fragmented, cross-sectional view of the catch 476 engaging the upper free end 452 of the carabiner body 442. The tabs 482 engage the rib 490 of the upper free end 452 to provide a secure nesting arrangement which is less likely to catch on clothing and other materials.

Figure 5:
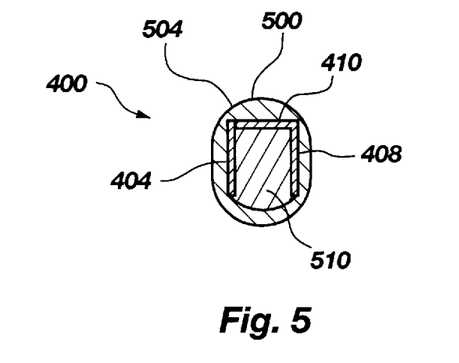
FIG. 5 shows a cross-sectional view of a carabiner gate having a layer of material disposed thereabout, and wherein the area between the wings is filled with material.

Referring to FIG. 5, there is shown a cross-sectional view of a gate 400 made in accordance with the teachings of the present invention. The gate 400 consists of first and second wings, 404 and 408 respectively, which are joined by a bridge 410. The gate 400 is circumscribed by a liner 500 which is disposed about the gate to protect ropes being used with the gate from wearing on the edges of the first and second wings 404 and 408 respectively. Those familiar with rock climbing or rappelling will appreciate that the edges of the wings could significantly increase wear on the ropes if left uncovered.

The liner 500 can be formed of numerous materials. For example, the liner 500 could be formed from a graphite composite, a thermo-plastic resin, or could simply be a nylon sleeve which wraps about the gate 400. The liner 500 could even be textured, as shown at 504 to give additional traction to the finger or thumb of a climber attempting to open the gate, while leaving the remainder of the liner smooth to decrease friction and wear on the ropes. Typically, the outer surface of the liner will be knurled.

In addition to the liner 500, a filler 510 may also be provided. The filler 510 fills the void between the first and second wings, 404 and 408 respectively, to give the gate 400 a more solid, secure feeling. The filler 510 also provides additional support to the gate 400.

If a filler 510 is used, it will typically be formed out of the same material as the liner 500. Thus for example, the filler 510 and the liner 500 may both be formed of a thermoplastic resin as one piece. This can be accomplished by covering the ends 412 and 416 of the gate 400 and then coating the gate in resin, etc. The resin is then cured. Alternatively, a rigid material may be used for the filler 510 and a resilient material used for the liner 500. Those skilled in the art will recognize numerous different liners 500 and fillers 510 which may be used to achieve desired characteristics for the gate 400, as well as numerous methods for applying filler/plastic.

Figure 6:
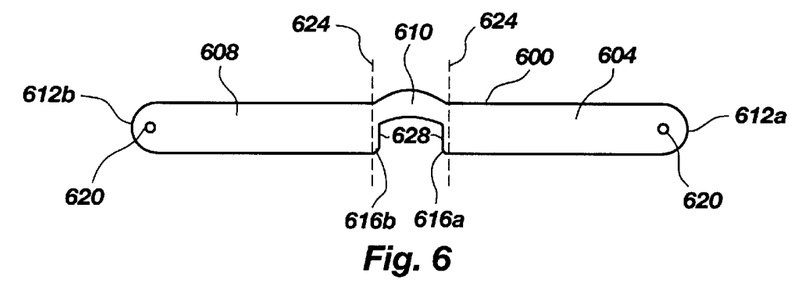
FIGS. 6–8 show views of alternate embodiments of the present invention.

Referring now to FIG. 6, there is shown yet another embodiment of the present invention. The gate 600 is formed by first and second wings, 604 and 608, respectively, which are cut in a liner arrangement. The first and second wings 604 and 608 are connected by a bridge 610. In such an arrangement, the first ends 612a and 612b are disposed at opposing ends of the gate 600 when it is formed from a piece of sheet metal. The second ends 616a and 616b are disposed adjacent each other and adjacent the bridge.

In order for the holes 620 in the first ends 612a and 612b to be disposed adjacent each other, so that they may be attached to the carabiner, the wings 604 and 608 are bent along bending lines 624 at the second ends 616a and 616b. Once the gate 600 has been bent, the bridge 610 is positioned to engage the carabiner body (not shown) so the gate 600 selectively closes the opening therein. Typically, the gate 600 will be coated with a thermo-setting plastic or a liner formed of some other material to provide a surface which is comfortable to work with.

In order to ensure secure engagement with the carabiner body (not shown) the second ends 616a and 616b are bent to form tabs 628 which will extend inwardly as discussed with respect to FIGS. 4A and 4B. The tabs 628 help to ensure that the gate 600 will not accidentally open during use.

Figure 6A:
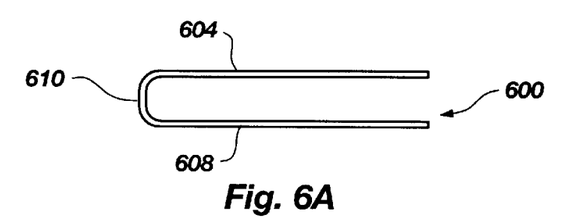

In FIG. 6A, there is shows a top view of the gate 600 wherein the second ends 616a and 616b have been bent to that the bridge 610 is positioned perpendicular to the wings 604 and 608. In such a position, the bridge 610 forms the catch which prevents over rotation of the gate 600 when it is attached to the carabiner.

Figure 7:
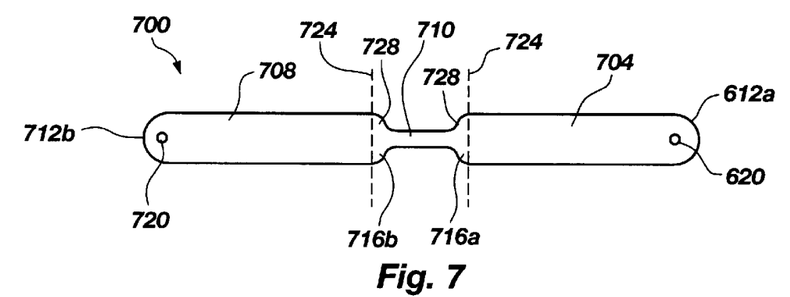

Referring now to FIG. 7, there is shown a plan view of yet another embodiment of the present invention. The gate 700 is formed of first and second wings, 704 and 708, respectively. The wings 704 and 708 are attached by a bridge 710 which connects the second ends 716a and 716b, while the first ends 712a and 712b of the wings remain unattached. To draw the holes 720 near the first ends 712a and 712b toward each other sufficiently, the wings are bent along bending lines 724 adjacent the second ends 716a and 716b. Thus, the bridge 710 interacts with the carabiner body (not shown) to limit movement of the gate. Tabs 728 may also be formed to provide a secure engagement with the carabiner body.

Figure 8:
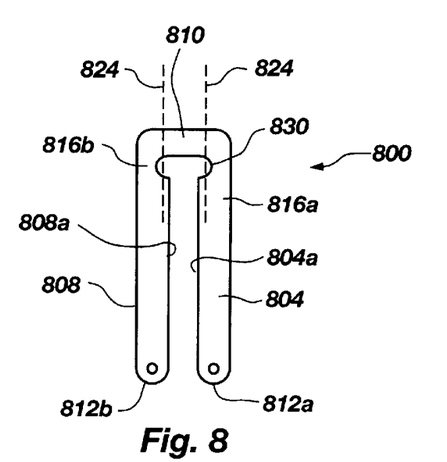

In FIG. 8, there is shown yet another embodiment of a carabiner gate, generally indicated at 800, in which the gate is formed from a sheet of metal, rather than by machining a piece of metal. The gate 800 is formed of first and second wings 804 and 808, respectively. When the gate 800 is cut from a piece of sheet metal, the first ends 812a and 812b are positioned adjacent one another, as are the second ends 816a and 816b. However, rather than being disposed between the wings 804 and 808, the bridge 810 extends outwardly from the second ends 816a and 816b and then across to the opposing arm.

To form a gate for use on a carabiner, the bridge 810 is bent along bending lines 824 so that the wings 804 and 808 face each other. A notch 830 may be formed in the second end 816a and 816b of each gate 804 and 808 so that the bridge is disposed above a lower edge of each wing, 804a and 808a respectively, when the gate 800 is bent into shape.

Thus there is disclosed a stamped carabiner gate which overcomes many of the disadvantages of the prior art. The gate can be formed in numerous different ways out of a sheet of metal. Forming the gate out of sheet metal reduces cost without reducing performance. Those skilled in the art will recognize numerous modifications which may be made without departing from the scope or spirit of the invention. The appended claims are intended to cover such modifications.

What is claimed is:

1. A carabiner gate for use with a carabiner having a prolate loop for circumscribing a void, and an opening for enabling the placement of items within the void, the gate comprising:

first and second elongate wings, for forming a carabiner gate, the wings being disposed such that each has an inner face disposed so as to generally face the opposing wing, each wing having a first end and a second end, the second end of the second wing extending beyond the second end of the first wing a sufficient length that the second end of the second wing can be folded so as to contact the second end of the first wing;

a bridge disposed so as to connect the first wing to the second wing; and attachment means disposed on the wings for connecting the wings to the prolate loop adjacent the opening and in a pivotable arrangement such that the first and second wings selectively close the opening in the prolate loop of the carabiner.

2. The carabiner gate of claim 1, wherein the second end of the second wing comprises a notch formed therein for nesting about the carabiner.

3. The carabiner gate of claim 2, wherein the second wing has a width and an outer edge, and wherein the notch extends from the outer edge between one-half and three-quarters of the width.

4. The carabiner gate of claim 2, wherein the first and second wings are disposed generally parallel to one another, and wherein the second end of the second wing is disposed generally perpendicular to the first and second wings so as to connect the second wing to the first wing and form a catch between the first and second wings.

5. The carabiner gate of claim 4, wherein the catch formed by the second end of the second wing includes at least one tab disposed adjacent the notch for frictionally engaging the carabiner.

6. The carabiner gate of claim 1, wherein the gate further comprises a liner disposed about the first and second wings and the bridge so as to circumscribe the gate.

7. The carabiner gate of claim 6, wherein the liner is formed of a composite material.

8. The carabiner gate of claim 6, wherein the liner is formed of a thermo-setting resin.

9. The carabiner gate of claim 6, wherein the liner is formed of a thermo-plastic resin.

10. The carabiner gate of claim 6, wherein the liner is formed of a resilient material.

11. A carabiner gate for use with a carabiner having a prolate loop for circumscribing a void, and an opening for enabling the placement of items within the void, the gate comprising:

first and second elongate wings, for forming a carabiner gate, the wings being disposed such that each has an inner face disposed so as to generally face the opposing wing, each wing having a first end and a second end;

a bridge disposed so as to connect the first wing to the second wing; and attachment means disposed on the wings for connecting the wings to the prolate loop adjacent the opening and in a pivotable arrangement such that the first and second wings selectively close the opening in the prolate loop of the carabiner; and wherein the gate further comprises a filler disposed between the first and second wings, the filler being made from a different material than the bridge.

12. The carabiner gate of claim 11, wherein the gate and the filler are circumscribed by a liner.

13. The carabiner gate of claim 12, wherein the liner has a textured surface disposed thereon.

14. The carabiner gate of claim 11, wherein the filler comprises at least one of the group consisting of composite material, thermo-setting resins and thermoplastic resins.

15. A method for making a carabiner gate for attachment to a carabiner defined by a prolate loop with an opening on one side thereof, the carabiner gate being pivotably attached to the carabiner to selectively close the opening, the method comprising:

(a) cutting a gate from a sheet of metal, the gate having first and second wings and a bridge disposed therebetween;

(b) bending the gate such that the first and second wings are disposed so as to face one another so as to define an area between the first and second wings,;

(c) disposing a filler in the area between the first and second wings; and (d) attaching a first end of the gate to the carabiner such that the carabiner pivots to selectively close the opening in the carabiner.

16. The method of making a stamped carabiner gate of claim 15, wherein each wing is attached to the bridge at an attachment point, and wherein step (b) comprises, more specifically, bending each wing relative to the bridge adjacent the attachment point so that the wings are disposed opposite one another.

17. The method of making a stamped carabiner gate of claim 15, wherein the gate has a second end opposite the first end, and wherein the method further comprises forming a catch at the second end of the gate.

18. The method of making a stamped carabiner gate of claim 17, wherein each wing has a second end, and where forming the catch comprises, more specifically, forming holes in the second end of each wing and passing a pin through said holes so as to connect the first and second wings.

19. A method for making a carabiner gate for attachment to a carabiner defined by a prolate loop with an opening on one side thereof, the carabiner gate being pivotably attached to the carabiner to selectively close the opening, the method comprising:

(a) cutting a gate from a sheet of metal, the gate having first and second wings and a bridge disposed therebetween;

(b) bending the gate such that the first and second wings are disposed so as to face one another; and (c) attaching a first end of the gate to the carabiner such that the carabiner pivots to selectively close the opening in the carabiner;

wherein each wing has a second end disposed opposite the first end of the gate, the second end of the second wing extending beyond the second end of the first wing and wherein the method further comprises forming a catch, wherein forming of the catch comprises, more specifically, bending the second end of the second wing into contact with the second end of the first wing.

20. The method of making a stamped carabiner gate of claim 19, wherein the method further comprises disposing a notch in the second end of the second wing such that the notch is disposed between the first and second wings when the second end of the second wing is bent into contact with the second end of the first wing.

21. The method of making a stamped carabiner gate of claim 20, wherein the method further comprises disposing tabs adjacent the notch and positioning the tabs such that the tabs engage the carabiner when the carabiner enters the notch.

22. The method of making carabiner gate of claim 17, wherein each wing has a second end, and where forming the catch comprises, more specifically, disposing the bridge adjacent the second end of the wings so that the bridge extends between the wings, thereby forming a catch adjacent the second end.

23. The method of making a carabiner gate of claim 22, wherein the method further comprises forming a notch in at least one wing adjacent the bridge.

24. A method for making a carabiner gate for attachment to a carabiner defined by a prolate loop with an opening on one side thereof, the carabiner gate being pivotably attached to the carabiner to selectively close the opening, the method comprising:

(a) cutting a gate from a sheet of metal, the gate having first and second wings and a bridge disposed therebetween, each of the wings having first and second ends;

(b) bending the gate such that the first and second wings are disposed so as to face one another; and (c) attaching the first end of each wing of the gate to the carabiner such that the carabiner pivots to selectively close the opening in the carabiner;

wherein the method further comprises bending the second ends of the wings toward the opposing wing so as to form tabs adjacent the bridge, the tabs being disposed to frictionally engage the carabiner body.

25. The method of making a stamped carabiner gate of claim 15, wherein the method further comprises positioning a liner about the gate so as to circumscribe the gate and minimize friction by the wings of the gate.

26. The method of making a carabiner gate of claim 25, wherein the method comprises, more specifically, selecting a liner having a textured outer surface and disposing the liner about the gate.

27. The method of making a stamped carabiner gate of claim 15, and wherein the method further comprises positioning filler material between the first and second wings, the filler material being formed from a different material than the wings and bridge.

* * * * *